(12) United States Patent
Lumsden

(10) Patent No.: US 8,120,307 B2
(45) Date of Patent: Feb. 21, 2012

(54) SYSTEM AND METHOD FOR PROVIDING CONSTANT LOADING IN AC POWER APPLICATIONS

(75) Inventor: John L. Lumsden, Boca Raton, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 485 days.

(21) Appl. No.: 12/187,186

(22) Filed: Aug. 6, 2008

(65) Prior Publication Data

US 2009/0200981 A1   Aug. 13, 2009

Related U.S. Application Data

(60) Provisional application No. 60/699,197, filed on Aug. 24, 2007, provisional application No. 61/009,810, filed on Jan. 3, 2008.

(51) Int. Cl.
*H02P 27/00* (2006.01)
(52) U.S. Cl. ............... 318/812; 318/34; 318/400.17; 318/599; 318/727; 318/767
(58) Field of Classification Search .......... 318/34, 318/727, 767, 812, 400.17, 599
See application file for complete search history.

(56) References Cited

U.S. PATENT DOCUMENTS

| | | |
|---|---|---|
| 2,276,358 A | 3/1942 | Vickers |
| 2,345,933 A | 4/1944 | Green et al. |
| 3,470,443 A | 9/1969 | Nola et al. |
| 3,470,446 A | 9/1969 | Nola et al. |
| 3,523,228 A | 8/1970 | Nola et al. |
| 3,541,361 A | 11/1970 | Nola |
| 3,582,774 A | 6/1971 | Forgacs |
| 3,671,849 A | 6/1972 | Kingston |
| 3,718,846 A | 2/1973 | Bejach |
| 3,740,629 A * | 6/1973 | Kohlhagen ............. 318/400.42 |
| 3,753,472 A | 8/1973 | Dwbwad et al. |
| 3,860,858 A | 1/1975 | Nola |
| 3,959,719 A | 5/1976 | Espelage |
| 3,976,987 A | 8/1976 | Anger |
| 4,039,946 A | 8/1977 | Nola |
| 4,052,648 A | 10/1977 | Nola |
| 4,096,436 A | 6/1978 | Cook et al. |
| 4,168,491 A | 9/1979 | Phillips et al. |
| 4,266,177 A | 5/1981 | Nola |

(Continued)

FOREIGN PATENT DOCUMENTS

EP   1650860 B1   8/2008

(Continued)

OTHER PUBLICATIONS

U.S. Appl. No. 12/185,442, Lumsden.

(Continued)

*Primary Examiner* — Walter Benson
*Assistant Examiner* — Kawing Chan
(74) *Attorney, Agent, or Firm* — Strasburger & Price, LLP

(57) ABSTRACT

A system and method are provided for constant loading in AC power applications where at least one turn-on point of at least one half cycle of a modulating sine wave is randomly selected; at least one turn-off point is determined; and at least one slice located between the at least one turn-on point and turn-off point is removed. The slices may be removed by utilizing insulated gate bipolar transistors or field effect transistors.

18 Claims, 8 Drawing Sheets

U.S. PATENT DOCUMENTS

| | | | |
|---|---|---|---|
| 4,333,046 A | 6/1982 | Lee | |
| 4,346,339 A | 8/1982 | Lewandowski | |
| 4,353,025 A | 10/1982 | Dobkin | |
| 4,388,585 A | 6/1983 | Nola | |
| 4,400,657 A | 8/1983 | Nola | |
| 4,404,511 A | 9/1983 | Nola | |
| 4,412,167 A | 10/1983 | Green et al. | |
| 4,417,190 A | 11/1983 | Nola | |
| 4,426,614 A | 1/1984 | Nola | |
| 4,429,269 A | 1/1984 | Brown | |
| 4,433,276 A | 2/1984 | Nola | |
| 4,439,718 A | 3/1984 | Nola | |
| 4,456,871 A | 6/1984 | Stich | |
| 4,469,998 A | 9/1984 | Nola | |
| 4,489,243 A | 12/1984 | Nola | |
| 4,513,240 A | 4/1985 | Putman | |
| 4,513,274 A | 4/1985 | Halder | |
| 4,616,174 A | 10/1986 | Jorgensen | |
| 4,644,234 A | 2/1987 | Nola | |
| 4,649,287 A | 3/1987 | Nola | |
| 4,659,981 A | 4/1987 | Lumsden | |
| 4,679,133 A | 7/1987 | Moscovici | |
| 4,689,548 A | 8/1987 | Mechlenburg | |
| 4,706,017 A | 11/1987 | Wilson | |
| 4,819,180 A | 4/1989 | Hedman et al. | |
| 4,859,926 A | 8/1989 | Wolze | |
| 4,876,468 A | 10/1989 | Libert | |
| 5,003,192 A | 3/1991 | Beigel | |
| 5,066,896 A | 11/1991 | Bertenshaw et al. | |
| 5,134,356 A | 7/1992 | El-Sharkawi et al. | |
| 5,136,216 A | 8/1992 | Wills et al. | |
| 5,180,970 A | 1/1993 | Ross | |
| 5,202,621 A | 4/1993 | Reischer | |
| 5,214,621 A | 5/1993 | Maggelet et al. | |
| 5,227,735 A | 7/1993 | Lumsden | |
| 5,239,255 A | 8/1993 | Schanin et al. | |
| 5,259,034 A | 11/1993 | Lumsden | |
| 5,299,266 A | 3/1994 | Lumsden | |
| 5,332,965 A | 7/1994 | Wolf et al. | |
| 5,350,988 A | 9/1994 | Le | |
| 5,362,206 A | 11/1994 | Westerman et al. | |
| 5,442,335 A | 8/1995 | Cantin et al. | |
| 5,481,140 A | 1/1996 | Maruyama et al. | |
| 5,481,225 A | 1/1996 | Lumsden et al. | |
| 5,506,484 A | 4/1996 | Munro et al. | |
| 5,543,667 A | 8/1996 | Shavit et al. | |
| 5,559,685 A | 9/1996 | Lauw et al. | |
| 5,600,549 A | 2/1997 | Cross | |
| 5,614,811 A | 3/1997 | Sagalovich et al. | |
| 5,615,097 A | 3/1997 | Cross | |
| 5,625,236 A | 4/1997 | Lefebvre et al. | |
| 5,635,826 A | 6/1997 | Sugawara | |
| 5,637,975 A | 6/1997 | Pummer et al. | |
| 5,652,504 A | 7/1997 | Bangerter et al. | |
| 5,699,276 A | 12/1997 | Roos | |
| 5,732,109 A | 3/1998 | Takahashi | |
| 5,747,972 A | 5/1998 | Baretich et al. | |
| 5,754,036 A | 5/1998 | Walker | |
| 5,828,200 A | 10/1998 | Ligman et al. | |
| 5,880,578 A | 3/1999 | Oliveira et al. | |
| 5,909,138 A | 6/1999 | Stendahl | |
| 5,936,855 A | 8/1999 | Salmon | |
| 5,942,895 A | 8/1999 | Popovich et al. | |
| 5,945,746 A | 8/1999 | Tracewell et al. | |
| 5,946,203 A | 8/1999 | Jiang et al. | |
| 5,994,898 A | 11/1999 | DiMarzio et al. | |
| 6,005,367 A | 12/1999 | Rohde | |
| 6,013,999 A | 1/2000 | Howard et al. | |
| 6,055,171 A | 4/2000 | Ishii et al. | |
| 6,118,239 A * | 9/2000 | Kadah | 318/268 |
| 6,184,672 B1 | 2/2001 | Berkcan | |
| 6,191,568 B1 | 2/2001 | Poletti | |
| 6,198,312 B1 | 3/2001 | Floyd | |
| 6,225,759 B1 | 5/2001 | Bogdan et al. | |
| 6,259,610 B1 | 7/2001 | Karl et al. | |
| 6,265,881 B1 | 7/2001 | Meliopoulos et al. | |
| 6,274,999 B1 | 8/2001 | Fujii et al. | |
| 6,297,610 B1 | 10/2001 | Bauer et al. | |
| 6,326,773 B1 | 12/2001 | Okuma et al. |
| 6,346,778 B1 | 2/2002 | Mason et al. |
| 6,351,400 B1 | 2/2002 | Lumsden |
| 6,400,098 B1 | 6/2002 | Pun |
| 6,411,155 B2 | 6/2002 | Pezzani |
| 6,414,455 B1 | 7/2002 | Watson |
| 6,414,475 B1 | 7/2002 | Dames et al. |
| 6,426,632 B1 | 7/2002 | Clunn |
| 6,449,567 B1 | 9/2002 | Desai et al. |
| 6,459,606 B1 | 10/2002 | Jadric |
| 6,483,247 B2 | 11/2002 | Edwards et al. |
| 6,486,641 B2 | 11/2002 | Scoggins et al. |
| 6,489,742 B2 | 12/2002 | Lumsden |
| 6,490,872 B1 | 12/2002 | Beck et al. |
| 6,528,957 B1 | 3/2003 | Luchaco |
| 6,548,988 B2 | 4/2003 | Duff, Jr. |
| 6,548,989 B2 | 4/2003 | Duff, Jr. |
| 6,553,353 B1 | 4/2003 | Littlejohn |
| 6,599,095 B1 | 7/2003 | Takada et al. |
| 6,618,031 B1 | 9/2003 | Bohn, Jr. et al. |
| 6,643,149 B2 | 11/2003 | Arnet et al. |
| 6,650,554 B2 | 11/2003 | Darshan |
| 6,657,404 B1 | 12/2003 | Clark et al. |
| 6,662,821 B2 | 12/2003 | Jacobsen et al. |
| 6,664,771 B2 | 12/2003 | Scoggins et al. |
| 6,678,176 B2 | 1/2004 | Lumsden |
| 6,690,594 B2 | 2/2004 | Amarillas et al. |
| 6,690,704 B2 | 2/2004 | Fallon et al. |
| 6,718,213 B1 | 4/2004 | Enberg |
| 6,724,043 B1 | 4/2004 | Ekkanath Madathil |
| 6,747,368 B2 | 6/2004 | Jarrett, Jr. |
| 6,774,610 B2 | 8/2004 | Orozco |
| 6,781,423 B1 | 8/2004 | Knoedgen |
| 6,801,022 B2 | 10/2004 | Fa |
| 6,836,099 B1 | 12/2004 | Amarillas et al. |
| 6,849,834 B2 | 2/2005 | Smolenski et al. |
| 6,912,911 B2 | 7/2005 | Oh et al. |
| 6,952,355 B2 | 10/2005 | Riggio et al. |
| 6,963,195 B1 | 11/2005 | Berkcan |
| 6,963,773 B2 | 11/2005 | Waltman et al. |
| 7,010,363 B2 | 3/2006 | Donnelly et al. |
| 7,019,474 B2 | 3/2006 | Rice et al. |
| 7,019,498 B2 | 3/2006 | Pippin et al. |
| 7,019,992 B1 | 3/2006 | Weber |
| 7,019,995 B2 | 3/2006 | Niemand et al. |
| 7,045,913 B2 | 5/2006 | Ebrahim et al. |
| 7,049,758 B2 | 5/2006 | Weyhrauch et al. |
| 7,049,976 B2 | 5/2006 | Hunt et al. |
| 7,061,189 B2 | 6/2006 | Newman, Jr. et al. |
| 7,062,361 B1 | 6/2006 | Lane |
| 7,068,184 B2 | 6/2006 | Yee et al. |
| 7,081,729 B2 | 7/2006 | Chang et al. |
| 7,091,559 B2 | 8/2006 | Fragapane et al. |
| 7,106,031 B2 | 9/2006 | Hayakawa et al. |
| 7,119,576 B1 | 10/2006 | Langhammer et al. |
| 7,123,491 B1 | 10/2006 | Kusumi |
| 7,136,724 B2 | 11/2006 | Enberg |
| 7,157,898 B2 | 1/2007 | Hastings et al. |
| 7,164,238 B2 | 1/2007 | Kazanov et al. |
| 7,188,260 B1 | 3/2007 | Shaffer et al. |
| 7,205,822 B2 | 4/2007 | Torres et al. |
| 7,211,982 B1 | 5/2007 | Chang et al. |
| 7,245,100 B2 | 7/2007 | Takahashi |
| 7,250,748 B2 | 7/2007 | Hastings et al. |
| 7,256,564 B2 | 8/2007 | MacKay |
| 7,259,546 B1 | 8/2007 | Hastings et al. |
| 7,263,450 B2 | 8/2007 | Hunter |
| 7,279,860 B2 | 10/2007 | MacKay |
| 7,288,911 B2 | 10/2007 | MacKay |
| 7,298,132 B2 | 11/2007 | Woolsey et al. |
| 7,298,133 B2 | 11/2007 | Hastings et al. |
| 7,301,308 B2 | 11/2007 | Aker et al. |
| 7,309,973 B2 | 12/2007 | Garza |
| 7,336,463 B2 | 2/2008 | Russell et al. |
| 7,336,514 B2 | 2/2008 | Amarillas et al. |
| 7,349,765 B2 | 3/2008 | Reaume et al. |
| 7,355,865 B2 | 4/2008 | Royak et al. |
| 7,358,724 B2 | 4/2008 | Taylor et al. |
| 7,378,821 B2 | 5/2008 | Simpson, III |

| | | |
|---|---|---|
| 7,386,713 B2 | 6/2008 | Madter et al. |
| 7,394,397 B2 | 7/2008 | Nguyen et al. |
| 7,397,212 B2 | 7/2008 | Turner |
| 7,397,225 B2 | 7/2008 | Schulz |
| 7,412,185 B2 | 8/2008 | Hall et al. |
| 7,417,410 B2 | 8/2008 | Clark, III et al. |
| 7,417,420 B2 | 8/2008 | Shuey |
| 7,436,233 B2 | 10/2008 | Yee et al. |
| 7,446,514 B1 | 11/2008 | Li et al. |
| 7,525,296 B2 | 4/2009 | Bilig et al. |
| 7,528,503 B2 | 5/2009 | Rognli et al. |
| 7,602,136 B2 | 10/2009 | Garza |
| 7,605,495 B2 | 10/2009 | Achart |
| 7,615,989 B2 | 11/2009 | Kojori |
| 7,622,910 B2 | 11/2009 | Kojori |
| 7,719,214 B2 * | 5/2010 | Leehey et al. .................... 318/34 |
| 7,791,326 B2 | 9/2010 | Dahlman et al. |
| 7,902,788 B2 | 3/2011 | Garza |
| 7,919,958 B2 | 4/2011 | Oettinger et al. |
| 8,004,255 B2 | 8/2011 | Lumsden |
| 2001/0010032 A1 | 7/2001 | Ehlers et al. |
| 2002/0109477 A1* | 8/2002 | Ikezawa ........................ 318/727 |
| 2003/0090362 A1 | 5/2003 | Hardwick |
| 2003/0181288 A1 | 9/2003 | Phillippe |
| 2004/0047166 A1 | 3/2004 | Lopez-Santillana et al. |
| 2004/0153170 A1 | 8/2004 | Santacatterina et al. |
| 2004/0181698 A1 | 9/2004 | Williams |
| 2004/0189265 A1 | 9/2004 | Rice et al. |
| 2004/0239335 A1 | 12/2004 | McClelland et al. |
| 2005/0033951 A1 | 2/2005 | Madter et al. |
| 2005/0068013 A1 | 3/2005 | Scoggins |
| 2005/0073295 A1 | 4/2005 | Hastings et al. |
| 2006/0049694 A1 | 3/2006 | Kates |
| 2006/0103365 A1 | 5/2006 | Ben-Yaacov |
| 2006/0175674 A1 | 8/2006 | Taylor et al. |
| 2006/0276938 A1 | 12/2006 | Miller |
| 2007/0024250 A1 | 2/2007 | Simpson, III |
| 2007/0024264 A1 | 2/2007 | Lestician |
| 2007/0037567 A1 | 2/2007 | Ungless et al. |
| 2007/0069668 A1 | 3/2007 | MacKay |
| 2007/0071047 A1 | 3/2007 | Huang et al. |
| 2007/0213776 A1 | 9/2007 | Brink |
| 2007/0244603 A1 | 10/2007 | Level |
| 2007/0279053 A1 | 12/2007 | Taylor et al. |
| 2007/0283175 A1 | 12/2007 | Marinkovic et al. |
| 2007/0290645 A1 | 12/2007 | Boyadjieff et al. |
| 2007/0300084 A1 | 12/2007 | Goodrum et al. |
| 2007/0300085 A1 | 12/2007 | Goodrum et al. |
| 2008/0005044 A1 | 1/2008 | Benya et al. |
| 2008/0043506 A1 | 2/2008 | Ozaki et al. |
| 2008/0049452 A1 | 2/2008 | Van Bodegraven |
| 2008/0104430 A1 | 5/2008 | Malone et al. |
| 2008/0116825 A1 | 5/2008 | Descarries et al. |
| 2008/0121448 A1 | 5/2008 | Betz et al. |
| 2008/0177678 A1 | 7/2008 | Di Martini et al. |
| 2008/0221737 A1 | 9/2008 | Josephson et al. |
| 2008/0272934 A1 | 11/2008 | Wang et al. |
| 2008/0281473 A1 | 11/2008 | Pitt |
| 2008/0290731 A1 | 11/2008 | Cassidy |
| 2008/0291607 A1 | 11/2008 | Braunstein et al. |
| 2009/0018706 A1 | 1/2009 | Wittner |
| 2009/0045804 A1 | 2/2009 | Durling et al. |
| 2009/0046490 A1 | 2/2009 | Lumsden |
| 2009/0051344 A1 | 2/2009 | Lumsden |
| 2009/0062970 A1 | 3/2009 | Forbes, Jr. et al. |
| 2009/0063228 A1 | 3/2009 | Forbes, Jr. |
| 2009/0083167 A1 | 3/2009 | Subbloie |
| 2009/0085545 A1 | 4/2009 | Shen et al. |
| 2009/0088907 A1 | 4/2009 | Lewis et al. |
| 2009/0094173 A1 | 4/2009 | Smith et al. |
| 2009/0105888 A1 | 4/2009 | Flohr et al. |
| 2009/0154206 A1 | 6/2009 | Fouquet et al. |
| 2009/0160267 A1 | 6/2009 | Kates |
| 2009/0189581 A1 | 7/2009 | Lawson et al. |
| 2009/0200981 A1 | 8/2009 | Lumsden |
| 2010/0001704 A1 | 1/2010 | Williams |
| 2010/0013427 A1 | 1/2010 | Kelley |
| 2010/0033155 A1 | 2/2010 | Lumsden |
| 2010/0117588 A9 | 5/2010 | Kelley |
| 2010/0320956 A1 | 12/2010 | Lumsden et al. |
| 2011/0080130 A1 | 4/2011 | Venkataraman |
| 2011/0121775 A1 | 5/2011 | Garza |
| 2011/0182094 A1 | 7/2011 | Lumsden et al. |

FOREIGN PATENT DOCUMENTS

| | | | |
|---|---|---|---|
| JP | 11-007328 A | | 1/1999 |
| JP | 11-241687 A | | 9/1999 |
| JP | 2001-245496 | | 9/2001 |
| JP | 2010-502533 A | | 1/2010 |
| KR | 10-2001-0006838 A | | 1/2001 |
| KR | 10-2009-0009872 A | | 1/2009 |
| WO | WO 8803337 A | * | 5/1988 |
| WO | WO 00-66892 | | 11/2000 |

OTHER PUBLICATIONS

U.S. Appl. No. 12/187,136, Lumsden.
International Search Report for International Application No. PCT/US2008/009482, dated Nov. 6, 2008 (2 pages).
Written Opinion of the International Search Authority for International Application No. PCT/US2008/009482, dated Nov. 6, 2008 (11 pages).
International Search Report for International Application No. PCT/US2008/009483, dated Nov. 18, 2008 (2 pages).
Written Opinion of the International Search Authority for International Application No. PCT/US2008/009483, dated Nov. 18, 2008 (6 pages).
International Search Report for International Application No. PCT/US2008/009533, dated Oct. 6, 2008 (2 pages).
Written Opinion of the International Search Authority for International Application No. PCT/US2008/009533, dated Oct. 6, 2008 (5 pages).
International Search Report for International Application No. PCT/US2008/010720, dated Nov. 15, 2008 (2 pages).
Written Opinion of the International Search Authority for International Application No. PCT/US2008/010720, dated Nov. 25, 2008 (4 pages).
International Search Report for International Application No. PCT/US2008/009393, dated Oct. 6, 2008 (3 pages).
Written Opinion of the International Search Authority for International Application No. PCT/US2008/009393, dated Oct. 6, 2008 (13 pages).
Frick, Vincent, et al., "CMOS Microsystem for AC Current Measurement with Galvanic Isolation," IEEE Sensors Journal, vol. 3, No. 6, pp. 752-760, 2003 IEEE (9 pages).
First Non-Final Office Action mailed Jun. 22, 2011, U.S. Appl. No. 12/185,442, filed Aug. 4, 2008, (22 pages).
Response and Amendment to First Non-Final Office Action mailed Aug. 4, 2011, U.S. Appl. No. 12/185,442, filed Aug. 4, 2008, (73 pages).
First Non-Final Office Action mailed Jun. 21, 2011, U.S. Appl. No. 12/187,136, filed Aug. 6, 2008, (7 pages).
Response and Amendment to First Non-Final Office Action mailed Aug. 1, 2011, U.S. Appl. No. 12/187,136, filed Aug. 6, 2008, (40 pages).
PCT Notification of Transmittal of The International Search Report and the Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 A1 (our file No. 133) (9 pages).
Extended European Search Report, European Patent Office, for Application No. 08795029.1-1242/2183849 PCT/US2008009393 dated Aug. 1, 2011; corresponding U.S. Appl. No. 12/185,442, now Publication No. US2009/0046490 A1 (our file No. 113) (10 pages).
PCT Notification of Transmittal of The International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (our file No. 127) (8 pages).
English language translation of Japanese Patent JP-11-007328 A above (13 pages).

English language translation of Japanese Patent JP 11241687 above (16 pages).

English language translation of Japanese Patent JP 2001-245496 above (14 pages).

English language translation of Japanese Patent JP 2010-502533 A above (16 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (our file No. 113) (15 pages).

Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPH-H (our file 113) where considered a "Y" reference (9 pages).

PCT Notification Concerning Transmittal of Copy of International Preliminary Report on Patentability mailed Feb. 20, 2010 from The International Bureau of WIPO; corresponding to U.S. Appl. No. 12/185,442, now Publication No. US2009/0046490 A1 (our file No. 113) (14 pages).

PCT Notification of Transmittal of The International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (our file No. 114) (15 pages).

PCT Notification of Transmittal of The International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (our file No. 115) (9 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (our file No. 116) (7 pages).

PCT Notification Concerning Transmittal of Copy of International Preliminary Report on Patentability mailed Feb. 17, 2011 from the International Bureau of WIPO; International Application No. PCT/US2008/009533 corresponding to U.S. Appl. No. 12/187,805, now Publication No. US2010/0033155 A1 (our file No. 116) (6 pages).

PCT Notification of Transmittal of The International Search Report and the Written Opinion of the International Searching Authority, or the Declaration, from the International Searching Authority USA (ISA/US) mailed Nov. 25, 2008; corresponding to International Application No. PCT/US 08/10720 and U.S. Appl. No. 12/207,913, now Publication No. US2010/0013427 A1 (our file No. 117) (8 pages).

PCT Notification Concerning Transmittal of Copy of International Preliminary Report on Patentability mailed Mar. 25, 2010 from the International Bureau of WIPO; corresponding to International Application No. PCT/US2008/1010720 and U.S. Appl. No. 12/207,913, now Publication No. US2010/0013427 A1 (our file No. 117) (7 pages).

English language translation of Official Action from the Eurasian Patent Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (our file No. 117) (2 pages).

PCT Notification of Transmittal of The International Search Report and the Written Opinion of the International Searching Authority, or the Declaration, from the International Searching Authority USA (ISA/US), mailed Oct. 15, 2010; corresponding to U.S. Appl. No. 12/873,510, now Publication No. US2010/0320956 A1 (our file No. 123) (11 pages.)

* cited by examiner

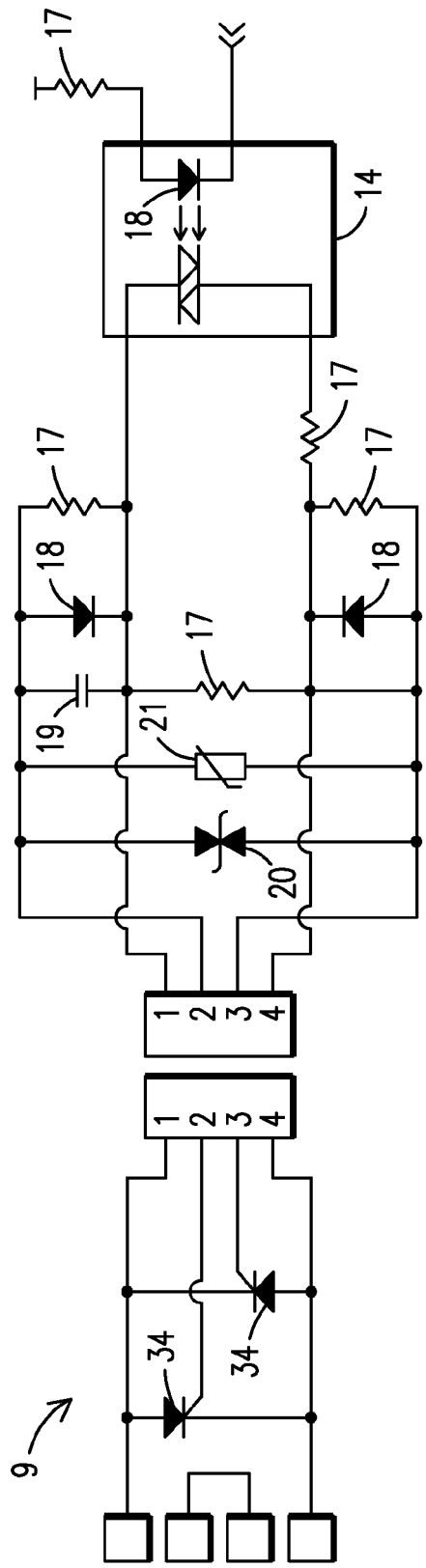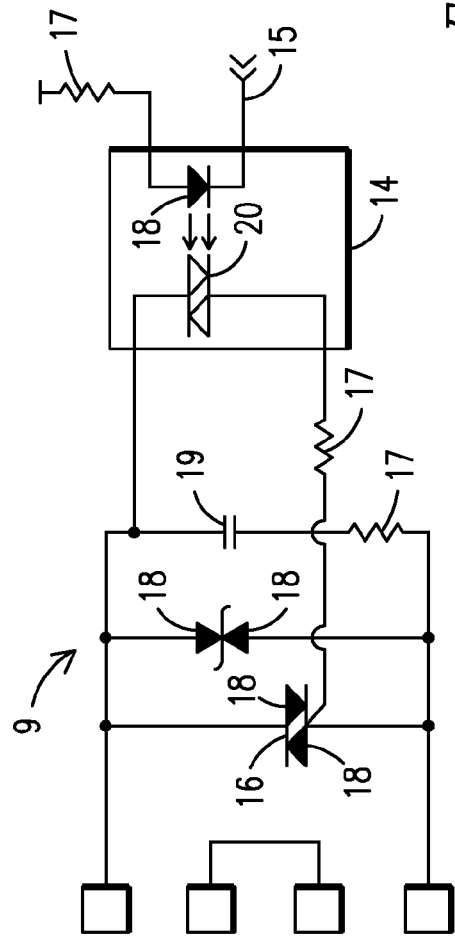
FIG. 2B
FIG. 2A

SYSTEM AND METHOD FOR PROVIDING CONSTANT LOADING IN AC POWER APPLICATIONS

CROSS REFERENCE TO RELATED APPLICATION

This application claims the benefit of U.S. Provisional Application Nos. 60/966,197 filed Aug. 24, 2007 and 61/009,810 filed Jan. 3, 2008.

BACKGROUND OF THE INVENTION

This invention relates to systems and methods for providing constant loading in AC power applications.

It is well known that electric motors waste power when not operating at maximum load. In order to improve the efficiency of such motors and other electronic devices, energy savings devices are commonly employed. Currently, energy savings devices utilize various devices in which to alter an incoming modulating sine wave of an alternating current, which is also known as an AC current. In order to realize an energy savings, direct pulse width modulation (PWM) (or modulation of a pulse carrier wherein the value of each instantaneous sample of a modulating wave produces a pulse of proportional duration by varying the leading, trailing, or both edges of a pulse and which is also known as pulse-duration modulation) is employed by most energy savings devices. These devices "phase-chop" the incoming modulating sine wave, meaning that at least one portion of an area under the curve of the incoming modulating sine wave is removed. Thus, at varying instances during the modulating sine wave, the alternating current increases to a maximum height and then suddenly drops to zero per half cycle. In essence, the alternating current is being turned on and turned off at various times during each half cycle.

Although phase-chopping does, in fact, reduce energy, the interruption in power by removing the portions cause, among other things, increased harmonic content and un-even loading on a generator and power transmission system. Due to these effects, optimum utilization of incoming AC power is not achieved.

Furthermore, most electrical devices rely on a constant loading of AC power and are manufactured as such. Thus, the electrical devices are programmed to depend on receipt of constant loading of AC power. Any deviation in timing or frequency of the AC power could affect the overall performance of the electrical device.

When AC power is chopped using a triode alternating current switch (TRIAC), a silicone controlled rectifier (SCR), a field effect transistor (FET) or an insulated gate bipolar transistor (IGBT) devices, the latter part of each half cycle of the incoming modulating sine wave is repeatedly used. Under such circumstances, although the overall energy load is reduced, the load across each half cycle is repetitively unbalanced. The repetitive unbalance of load on each half cycle ultimately results in compromised performance of the electrical devices in which the energy savings device is connected thereto.

Thus, a need exists for a system and method for providing constant loading in AC power applications.

The relevant patents of prior art includes the following references:

| Patent/Ser. No. | Inventor | Issue/Publication Date |
| --- | --- | --- |
| 7,336,514 | Amarillas et al. | Feb. 26, 2008 |
| 6,836,099 | Amarillas et al. | Dec. 28, 2004 |
| 6,690,594 | Amarillas et al. | Feb. 10, 2004 |
| 7,061,189 | Newman, Jr. et al. | Jun. 13, 2006 |
| 6,459,606 | Jadric | Oct. 01, 2002 |
| 6,400,098 | Pun | Jun. 04, 2002 |
| 6,326,773 | Okuma et al. | Dec. 04, 2001 |
| 6,225,759 | Bogdan et al. | May 01, 2001 |
| 5,747,972 | Baretich et al. | May 05, 1998 |
| 5,614,811 | Sagalovich et al. | Mar. 25, 1997 |

SUMMARY OF THE INVENTION

The primary object of the present invention is to provide a system and method for providing constant loading in AC power applications on a cycle by cycle basis.

Another object of the present invention is to provide a system and method for providing constant loading in AC power applications on a half cycle basis.

Another object of the present invention is to provide a system and method for providing constant loading in AC power applications on a multiple-cycle basis.

Another object of the present invention is to provide a system and method for providing constant loading in AC power applications wherein loading is evenly applied on a generator.

A further object of the present invention is to provide a system and method for providing constant loading in AC power applications wherein even loading on a power transmission system is achieved.

Another object of the present invention is to provide a system and method for providing constant loading in AC power applications wherein harmonic content is reduced.

A further object of the present invention is to provide a system and method for providing constant loading in AC power applications wherein optimum utilization of incoming power is realized.

Another object of the present invention is to provide a system and method for providing constant loading in AC power applications wherein all energy saved is released for use in other applications.

Another object of the present invention is to provide a system and method for providing constant loading in AC power applications wherein motors, appliances, systems and individual areas are easily networked for energy conservation.

A further object of the present invention is to provide a system and method for providing constant loading in AC power applications wherein motors, appliances, systems and individual areas are easily networked for control of individual appliances.

An even further object of the present invention is to provide a system and method for providing constant loading in AC power applications wherein motors, appliances, systems and individual areas are easily networked for reducing associated costs of operation.

Another object of the present invention is to provide a system and method for providing constant loading in AC power applications wherein the method may be applied to energy savings devices.

A further object of the present invention is to provide a system and method for providing constant loading in AC power applications wherein voltage is reduced and regulated to a lower value.

An even further object of the present invention is to provide a system and method for providing constant loading in AC power applications wherein the same voltage is applied to all end users on a line voltage.

Another object of the present invention is to provide a system and method for providing constant loading in AC power applications wherein an end user is provided with a utility cost savings.

Another object of the present invention is to provide a system and method for providing constant loading in AC power applications wherein the life of an end user's equipment is increased.

Another object of the present invention is to provide a system and method for providing constant loading in AC power applications wherein quieter and cooler operation of equipment and appliances is realized.

A further object of the present invention is to provide a system and method for providing constant loading in AC power applications wherein saved energy is released for distribution to other end users.

An even further object of the present invention is to provide a system and method for providing constant loading in AC power applications wherein a load on power transmission equipment is reduced.

Another object of the present invention is to provide a system and method for providing constant loading in AC power applications wherein consumption of fossil fuels is reduced.

The present invention fulfills the above and other objects by providing a system and method for providing constant loading in AC power applications wherein at least one turn-on point of at least one half cycle of a modulating sine wave is determined, at least one turn-off point of said at least one half cycle of said modulating sine wave is determined and at least one slice located under said at least one half cycle of said modulating sine wave wherein said at least one slice is an area under said at least one half cycle between said at least one turn-off point and said at least one turn-on point is removed. So long as the area under the energy curve is equal in area, then the root-mean-square (RMS) value will be identical, regardless of shape. Therefore, an agile system where the turn-on point is randomized on a half cycle, full cycle or multiple cycles will always exhibit an identical RMS value. The turn-off point is calculated to provide energy appropriate to that which is required by the load or preset by the consumer. Each cyclic power period will be time division multiplexed and randomized automatically over any number of devices, independent of location. The invention may be controlled by a network power coordinator, such as a purpose built computer/controller.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 2A is a circuit diagram of a TRIAC-based reducing means of the present invention;

FIG. 2B is a circuit diagram of a SCR-based reducing means of the present invention;

DESCRIPTION OF THE PREFERRED EMBODIMENTS

Figure 1:
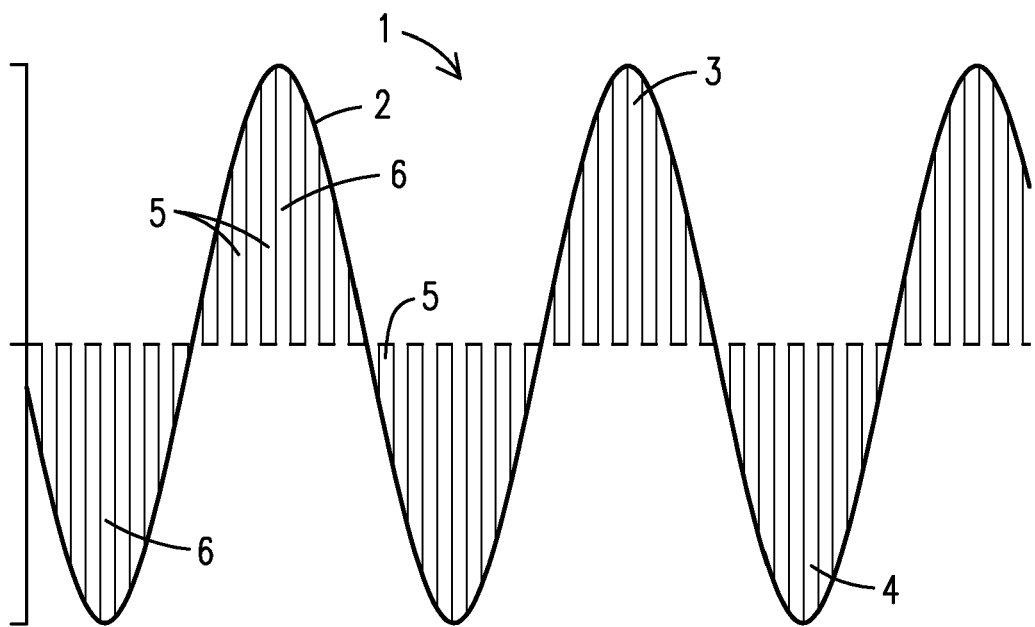
FIG. 1 is an oscillogram showing a voltage reducing means of the present invention.

For purposes of describing the preferred embodiment, the terminology used in reference to the numbered components in the drawings is as follows:

| | |
|---|---|
| 1. | constant loading means, generally |
| 2. | modulating sine wave |
| 3. | positive half cycle |
| 4. | negative half cycle |
| 5. | slice |
| 6. | area |
| 7. | turn-on point |
| 8. | turn-off point |
| 9. | drive control |
| 10. | power coordinator |
| 11. | modulation drive wave form |
| 12. | resultant voltage modulation |
| 13. | zero cross point |
| 14. | optically-isolated TRIAC |
| 15. | terminal |
| 16. | main TRIAC |
| 17. | resistor |
| 18. | diode |
| 19. | capacitor |
| 20. | transorb device |
| 21. | varistor |
| 22. | crest |
| 23. | network server |
| 24. | motor controller |
| 25. | positive half cycle control transistor |
| 26. | negative half cycle control transistor |
| 27. | IGBT first shunt control transistor |
| 28. | IGBT second shunt control transistor |
| 29. | optically-coupled driver |
| 30. | network |
| 31. | FET first shunt control transistor |
| 32. | FET second shunt control transistor |
| 33. | Schmidt-triggered inverting buffer |
| 34. | SCR device |

With reference to FIG. 1, an oscillogram showing a constant loading means of the present invention is shown. The constant loading means 1 reduces analog signals of a modulating sine wave 2 by removing at least one slice 5 from an area 6 under the curve of the modulating sine wave 2, thereby reducing energy and without the attendant harmonics previously associated with such voltage control. At least one turn-on point 7 and at least one turn-off point 8 are determined wherein the turn-on points 7 and turn-off points 8 are located under the curve of the modulating sine wave 2 in both the positive half cycles 3 and negative half cycles 4. The turn-on point 7 is triggered via at least one drive control 9, which may be at least one triode alternating current switch (TRIAC), at least one silicone controlled rectifier (SCR), at least one insulated gate bipolar transistor (IGBT) or at least one field effect transistor (FET), the drive controls 9 of which are discussed below.

All of the potential energy is contained in each half cycle and, in the case of a complete half cycle, has the greatest area under the curve. If each half cycle is modulated on a mark space ratio of 90%, the area under the curve is reduced by 10% and, as a result, the energy is reduced proportionally.

The original shape of the modulating sine wave 2 is retained and, since modulation can be made high, possibly 10's of KHz, filtering of the output is possible due to the smaller size of the wound components becoming a practical proposition. The overall effect is realized when the root-mean-square value (RMS), which is the square root of the time average of the square of a quantity or, for a periodic quantity, the average is taken over one complete cycle and which is also referred to as the effective value, is correctly measured and the output voltage is seen to be reduced by a percentage similar to the mark space ratio employed. Reduced voltage results in reduced current, thereby resulting in reduced power consumed by an end user.

Figure 2:
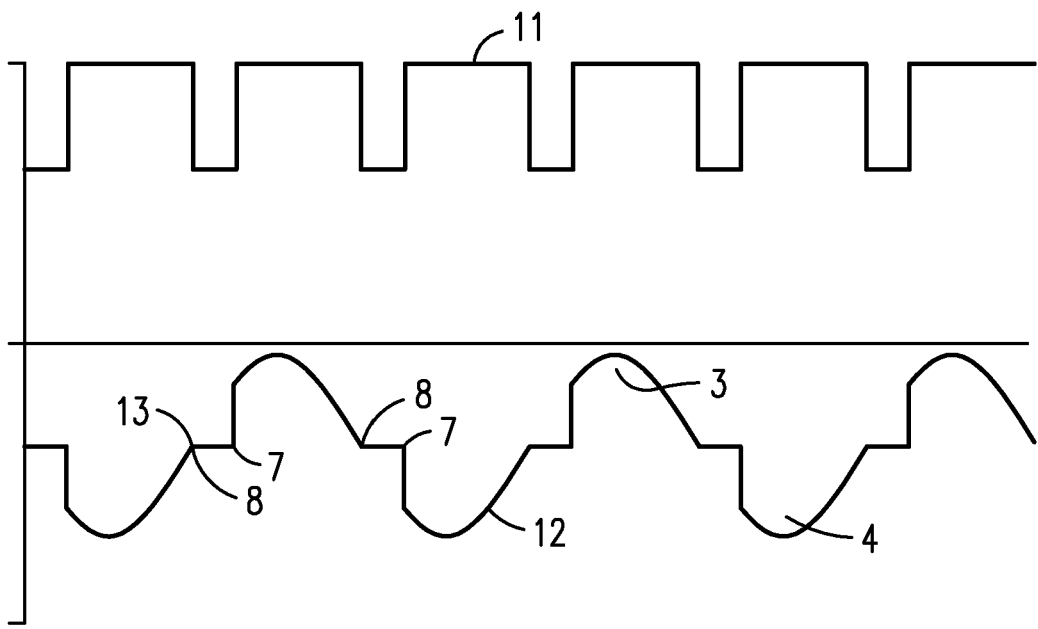
FIG. 2 is an oscillogram showing a modulation drive wave form and a resultant voltage modulation when utilizing the system and method of the present invention in conjunction with TRIAC's or SCR's.
Figure 3:
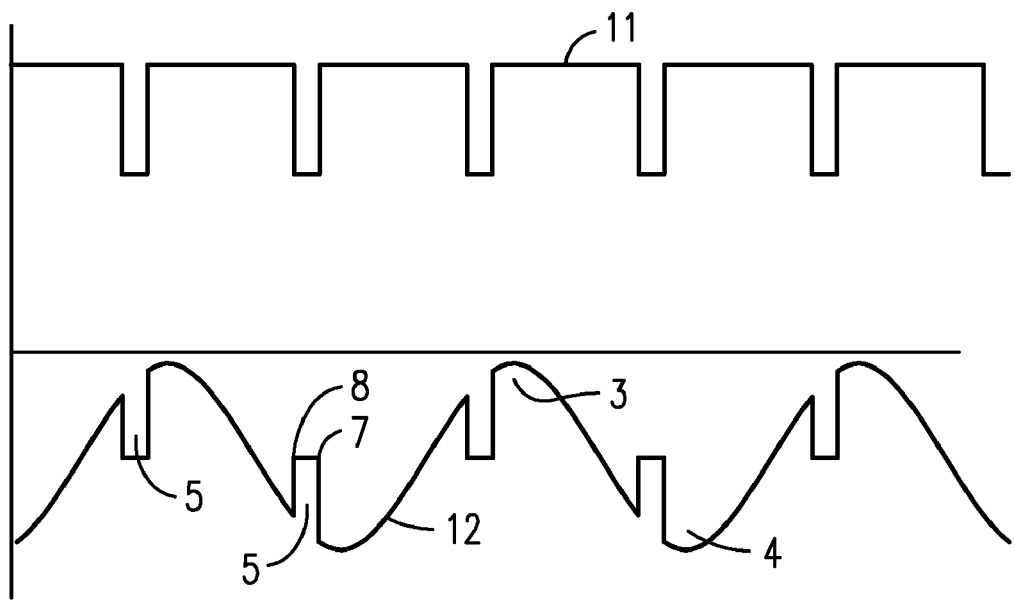
FIG. 3 is an oscillogram showing a modulation drive wave form and another resultant voltage modulation when utilizing the system and method of the present invention in conjunction with IGBT's or FET's.

FIGS. 2, 2A and 2B is an oscillogram and circuit diagrams showing a modulation drive wave form and a resultant voltage modulation when utilizing the system and method of the present invention in conjunction with a TRIAC or SCR drive control. The present invention works in conjunction with the inherent characteristics common to TRIAC's and SCR's that allow the turn on-point 7 to be determined by an end-user and the turn-off point 8 to be determined when the current of the modulating sine wave 2 passes through or falls close to zero, which is a holding current. All of the potential energy is contained in each half cycle 3 and 4 and, in the case of a complete half cycle, has the greatest area under the curve if the TRIAC or SCR is triggered after the zero cross point 13 as it can be seen that this area is reduced and, as a result, the energy is reduced.

The oscillogram of FIG. 2 illustrates both the modulation drive wave form 11 on the upper trace and the resultant voltage modulation 12 on the lower trace. It can be clearly seen that the area under the curve of the resultant voltage modulation 12 is smaller in area than that of the modulating sine wave 2 as a plurality of slices 5 have been removed and, hence, the root mean squared (RMS) voltage is reduced. The effect is apparent when the RMS is correctly measured and, in every case of firing after the zero crossing, the RMS is reduced. Reduced voltage results in reduced current which results in reduced power being consumed.

TRIAC's and SCR's are suitable for use in single appliance controls and where the current harmonics are not considered to be a problem or when feeding a load that is inductive since the inductive component of the load has a self-filtering action.

When the drive control 9 is a TRIAC implementation, as shown in FIG. 2A, an optically-isolated TRIAC 14 receives command signals from a microprocessor via a terminal 15 and triggers a main TRIAC 16 wherein diodes 18 are utilized. Resistors 17, capacitors 19 and a transorb device 20 are arranged as shown to assist in the absorption of switching transients and to help protect the TRIAC from line power born high voltage spikes.

When the drive control 9 is a SCR implementation, as shown in FIG. 2B, is generally used when high levels of power need to be controlled. There are many similarities between the TRIAC implementation and the SCR implementation and only differ as the drive requirements of two SCR devices 34 increase the complexity of the circuitry. An additional varistor 21 is provided in the SCR implementation for three-phase electrical systems wherein the varistor 21 is controlling higher than 250 volts RMS per phase. The diodes 18 perform a drive steering function so that each SCR 34 is triggered appropriate to its half cycle commitment.

Figure 4:
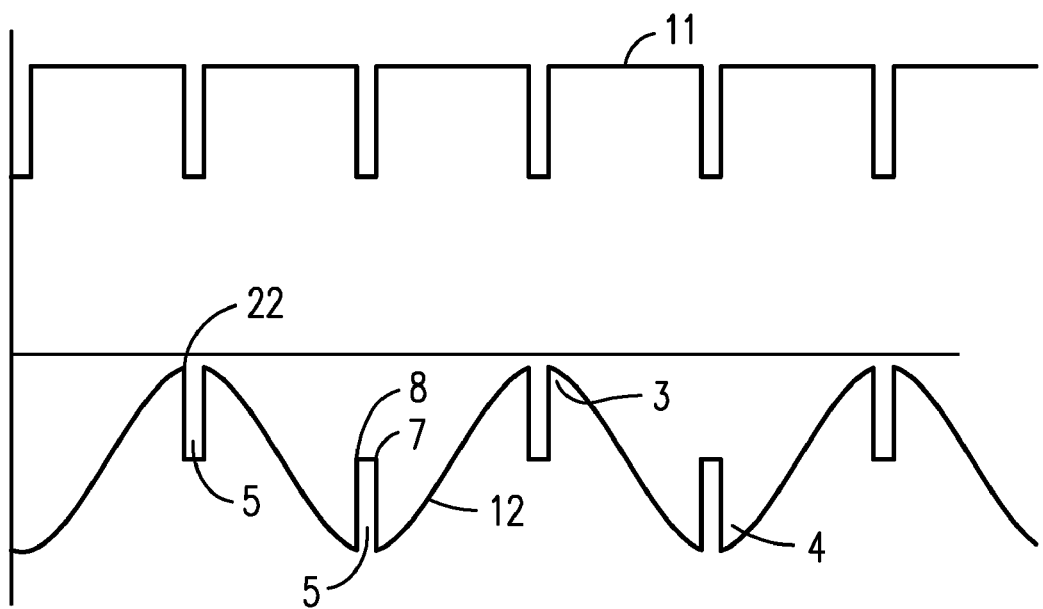
FIG. 4 is an oscillogram showing a modulation drive wave form and another resultant voltage modulation when utilizing the system and method of the present invention in conjunction with IGBT's or FET's.
Figure 5:
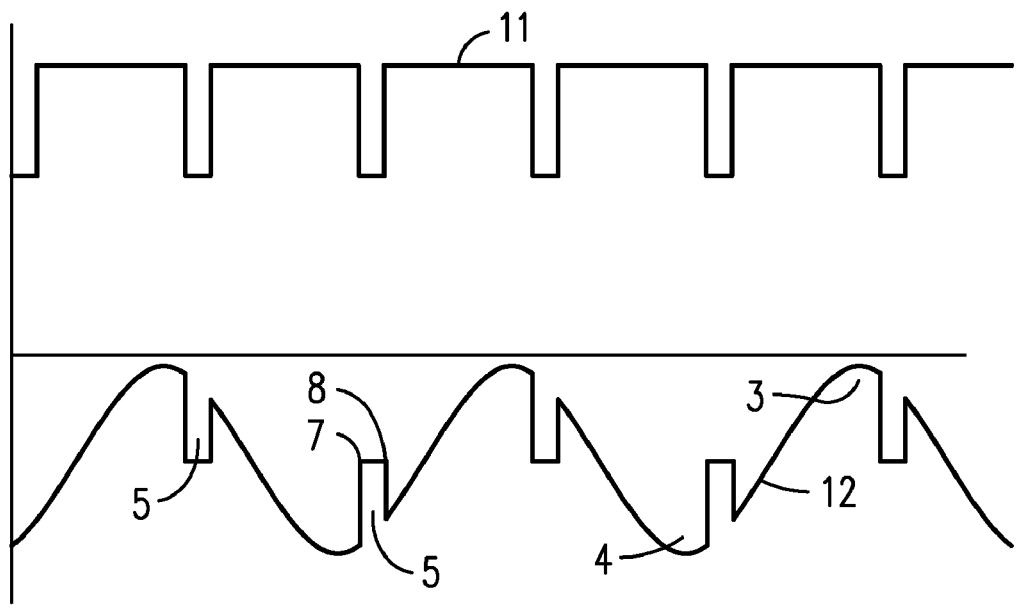
FIG. 5 is an oscillogram showing a modulation drive wave form and another resultant voltage modulation when utilizing the system and method of the present invention in conjunction with IGBT's or FET's.
Figure 6:
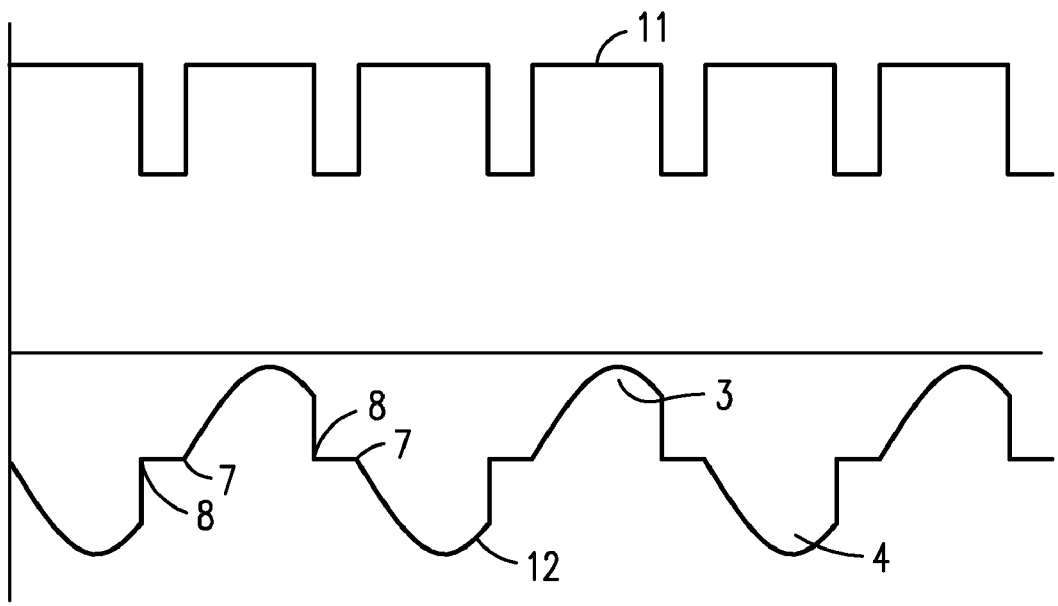
FIG. 6 is an oscillogram showing a mirror image of FIG. 2.

In FIGS. 3-6, oscillograms showing a modulation drive wave form and another resultant voltage modulation when utilizing the system and method of the present invention in conjunction with IGBT's or FET's are shown. The lower traces of the oscillograms, or the resultant voltage modulations 12, vary in each oscillogram as the slices 5 removed from the modulating sine waves 2 are varied, as well as the location of removal from the half cycles 3 and 4. For instance, in FIG. 3, a narrower slice 5 is removed as compared to FIG. 2. In FIG. 4, a slice 5 is removed from a crest 22 of the half cycles 3 and 4, which is the narrowest section removed from the modulating sine wave 2. In FIG. 5, a slice 5 is removed later in the half cycles 3 and 4 and of the same size as that shown in FIG. 3. If the width of the slice 5 removed is on the slope of the modulating sine wave 2, then the slice 5 removed must be slightly wider as compared to removing the slice 5 from the crest 22 of the modulating sine wave 2 as with width of the slice 5 removed needs to be increased to maintain the area of energy being used. Finally, as is shown in FIG. 6, an oscillogram showing a mirror image of FIG. 2 indicative that the resultant voltage modulation 12 is identical to that shown in FIG. 2.

In all cases, the portion of the area under the modulating sine wave 2 that is removed is identical so as to preserve the RMS voltage that is being targeted. In addition, the area removed obeys sinusoidal laws of electrical engineering calculated to accurately remove identical areas, thereby preserving the wave shape and obeying sinusoidal laws.

The constant loading means 1 of the present invention works in conjunction with the inherent characteristics of the IGBT/FET devices that allow the turn-on points 7 and turn-off points 8 to be controlled.

Figure 7:
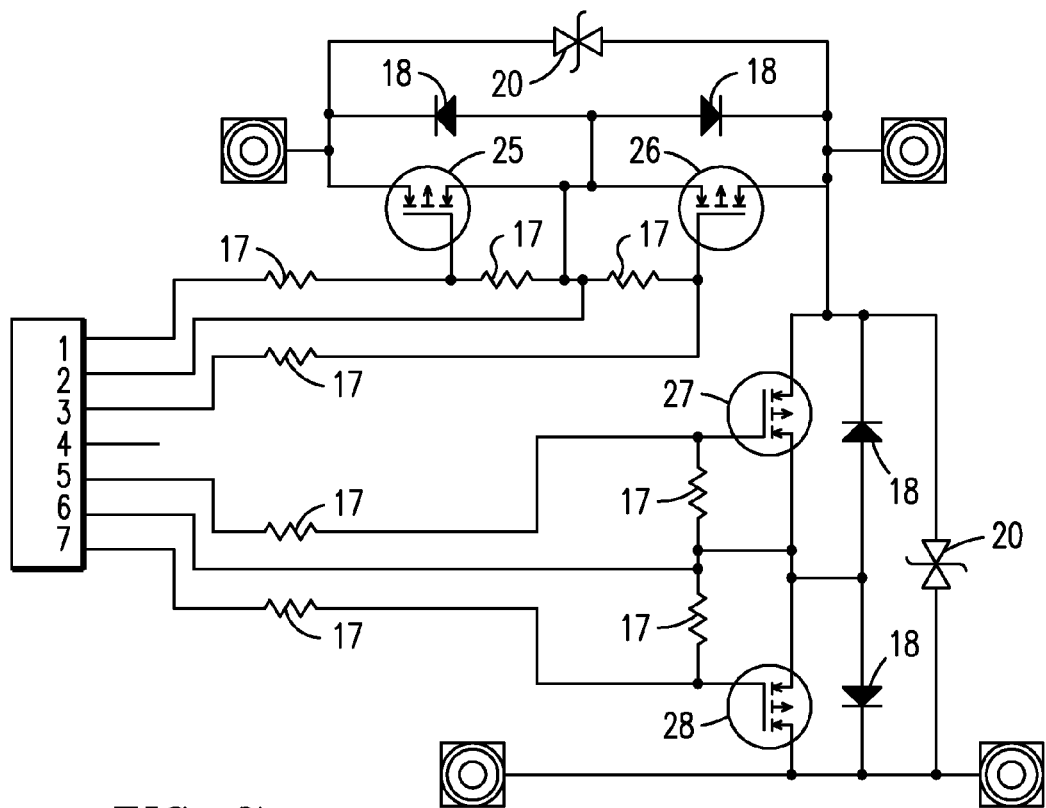
FIG. 7 is a circuit diagram of an IGBT-based voltage reducing means of the present invention.
Figure 8:
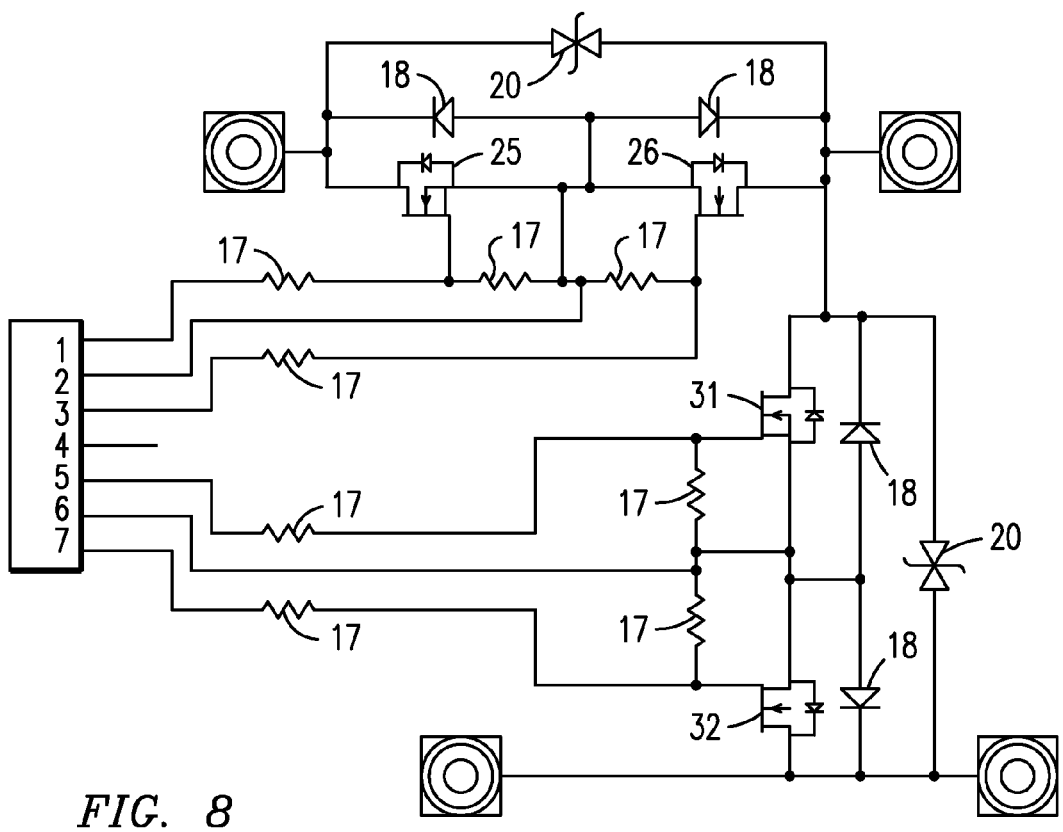
FIG. 8 is a circuit diagram of a FET-based voltage reducing means of the present invention.
Figure 7A:
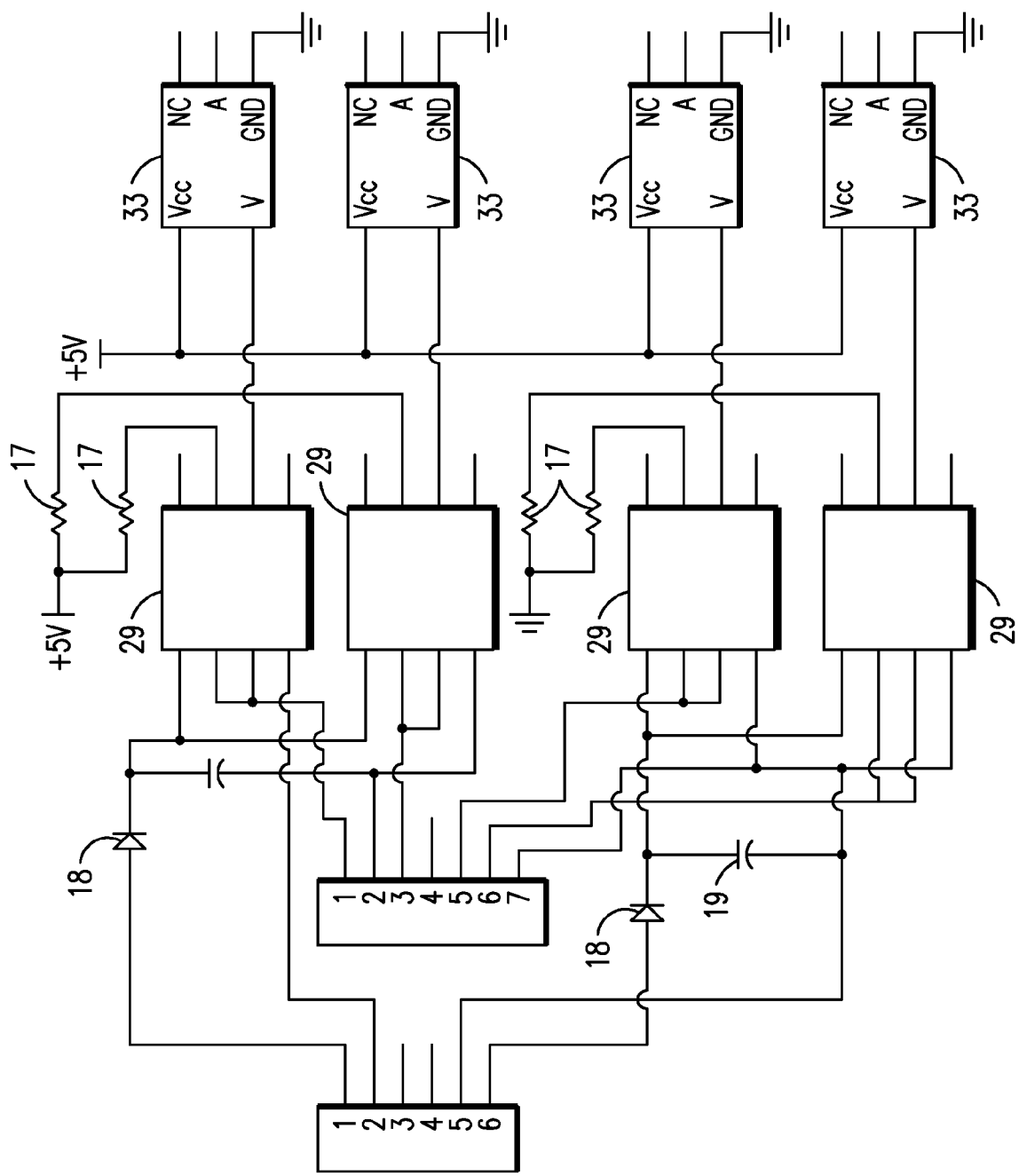
FIG. 7A is a circuit diagram of a drive circuitry for the IGBT-based voltage reducing means of FIG. 7.
Figure 8A:
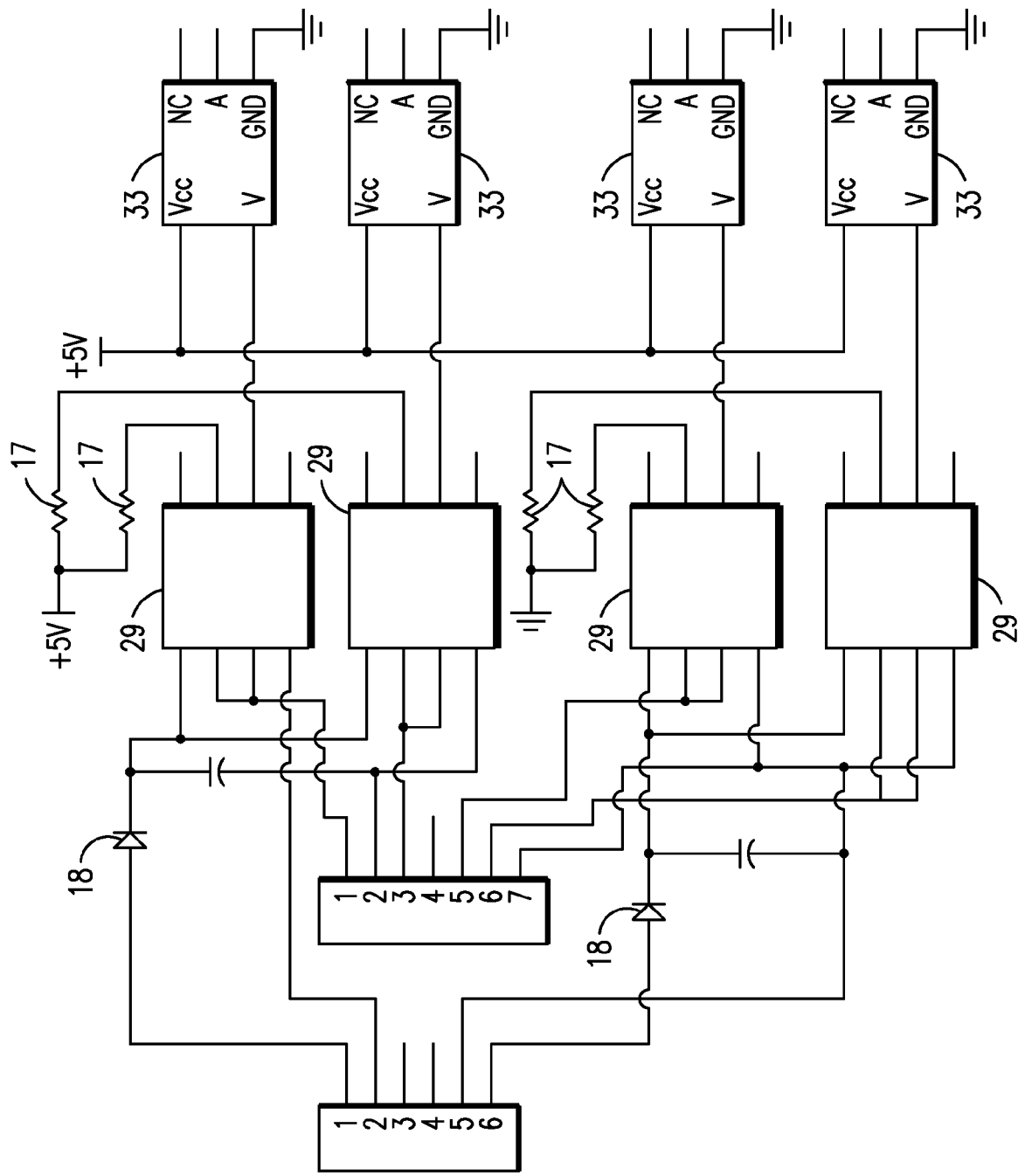
FIG. 8A is a circuit diagram of a drive circuitry for the FET-based voltage reducing means of FIG. 8.

FIGS. 7 and 7A are circuit diagrams of an IGBT-based constant loading means and drive circuitry for the IGBT-based constant loading means of the present invention are shown, while FIGS. 8 and 8A are circuit diagrams of a FET-based constant loading means and drive circuitry for the FET-based constant loading means of the present invention. As the hardware utilized in the IGBT-based and FET-based energy constant loading means 1 of the present invention is identical with the only difference being the IGBT/FET half cycle control transistors 25 and 26 and the IGBT/FET shunt control transistors 27, 28, 31 and 32. The circuit diagrams of the IGBT-based circuitry FIG. 7 and the IGBT-based driver FIG. 7A and the FET-based circuitry FIG. 8 and the FET-based driver FIG. 8A are shown for comparison purposes.

The implementation of IGBT's and FET's permit control to be applied identically to pairs or multiple pairs of half cycles 3 and 4 to avoid differential between the positive and negative modulus creating a direct current (DC) offset. So long as the areas under the curve of the modulating sine wave 2 are identical, then the true RMS voltages will be identical, regardless of shape. Therefore, an agile system wherein the turn-on point 7 is randomized on half cycle 3 and 4, fully cycle or multiple cycles will always exhibit an identical RMS value. This randomized implementation serves single applications well. However, for multiple applications where there are a plurality of electronic devices to be operated, such as motors, the management can be undertaken by a server providing the agility to assure constant loading of the modulating sine wave 2.

Since IGBT and FET devices are unipolar in nature, in the case of AC control, it is necessary to provide at least one IGBT/FET drive control 15 to control each half cycle. Furthermore, to avoid reverse biasing, steering diodes are used to route each half cycle to the appropriate device. Additionally, many IGBT and FET devices have a parasitic diode shunting main element wherein connecting two IGBT or FET devices in inverse parallel would result in having two of the parasitic diodes in inverse parallel, thereby rendering the arrangement inoperative as a controlling element.

The diodes 18 are connected across the positive half cycle control transistor 25 and the negative half cycle control transistor 26 and work ideally for a purely resistive load or a current-leading reactive load. However, when driving a load with a current lagging power factor, when the current in an inductively reactive component is suddenly removed, as is the case when the modulation occurs, the collapsing magnetic field attempts to keep the current going, similar to an electronic fly-wheel, and produces an EMF that will rise in voltage until it finds a discharge path that will enable release of the energy. With this arrangement, this "back EMF" would cause active components of the series control element to fail. To prevent this from occurring, additional IGBT/FET shunt control transistors 27, 28, 31 and 32 are placed in a shunt configuration.

During the positive half cycle 3, the positive half cycle control transistor 25 modulates and a diode 18 is active during the complete positive half cycle. The IGBT second shunt control transistor 28 is turned fully on and a diode 18 is active. Therefore, any opposite polarity voltages resulting from the back EMF of the load are automatically clamped.

During the negative half cycle 4, the other devices comprised in series and shunt networks are activated in a similar manner.

During the switching transitions, a spike may be present which may last for a very short period of time. The spike is clamped by the transorb devices 20, which are capable of absorbing large amounts of energy for a very short period of time and enables vary fast response time. The transorb devices 20 also clamp any mains bourn transient signals due to lightning strikes or other sources that could otherwise damage the active components of the series or shunt elements. Further, while each series element is pulse width modulating, the other series element is turned fully on for the precise duration of the half cycle. The duties of these series elements reverse during the next half cycle. This process provides complete protection against the back EMF signals discussed above. This arrangement is necessary, especially near the zero crossing time when both shunt elements are in transition.

Each of the IGBT/FET half cycle control transistors 25 and 26 and the IGBT/FET shunt control transistors 27, 28, 31 and 32 have insulated gate characteristics that require the devices to be enhanced to enable them to turn on. This enhancement voltage is preferably 12 Volts in magnitude and is preferably supplied by a floating power supply, preferably one for each pair. This is only possible since the IBGT/FET devices are operated in the common emitter mode in the case of the IGBT's and in the common source mode in the case of the FET's; otherwise, four isolated power supplies would be required for each phase. Each of the pairs requires a separate drive signal that is provided by the isolated, optically-coupled drivers 29. These drivers 29 make use of the isolated supplies and serve to very rapidly turn-off and turn-on each power device. These drivers 29 are active in both directions, which is necessary since the input capacitance of the power devices are high and have to be actively discharged rapidly at the turn-off point 8 and charged rapidly at the turn-on point 7.

Figure 9:
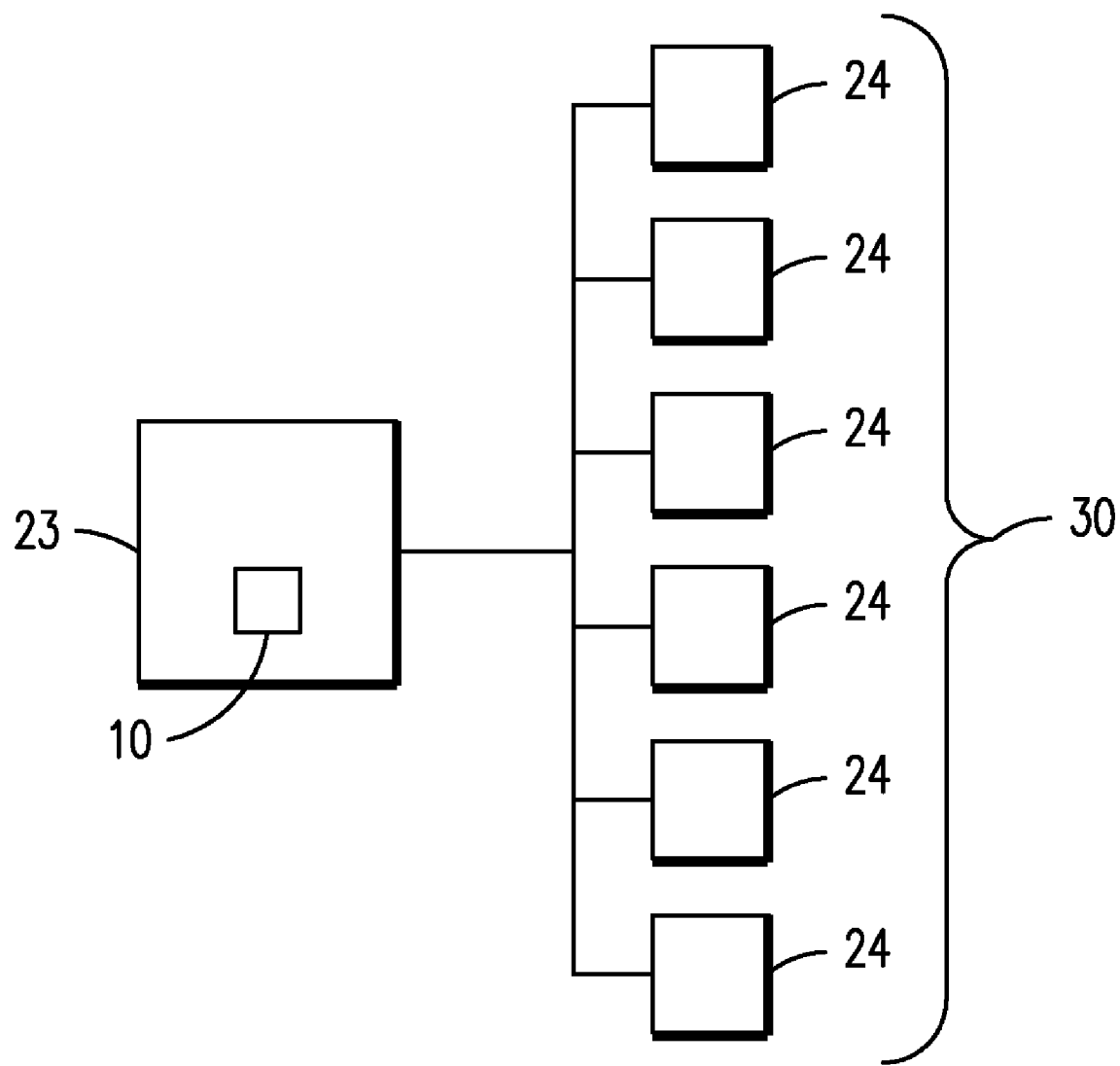
FIG. 9 is a block diagram showing a networked system utilizing the present invention.

Finally, FIG. 9 shows a block diagram showing a networked system utilizing the present invention. A network server 23 having at least one power coordinator 10, which may be a personal computer, workstation, main frame computer or any other computing device or purpose built computer/controller, allows the monitoring of at least one motor controller 24 connected in a network 30. The power coordinator 10 polls and determines the status of each motor controller 24. Motor controllers 24 are grouped according to a consumption level of power. Multiple groups are created and, if necessary, reassigned to other groups according to their cyclic demands. In other words, each half cycle of power is time division multiplexed to provide each motor controller 24 within each group with the required energy. Full utilization of each cycle of the main power is assured without the large delta volts, delta time and delta amps excursions that are responsible for harmonics. Thus, harmonic distortion is reduced to a minimum.

The power coordinator 10 communicates with each of the motor controllers 24 by optical, wired or wireless means, included, but not limited to, wide area network (WAN), local area network (LAN), private area network (PAN), ethernet, USB, Zigbee® or Bluetooth™.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A method for providing constant loading in AC power applications using a modulating sine wave having a constant first root mean squared voltage and positive half cycles and negative half cycles, said method comprising the steps of:

selecting randomly a plurality of turn-on points along said modulating sine wave, wherein each of said turn-on points is paired with a turn-off point that immediately precedes said turn-on point, and wherein said selection of said turn-on points is made via at least one insulated gate bipolar transistor;

determining said turn-off points;

removing slices from said modulating sine wave wherein each of said slices is between one of said pairs of turn-off points and turn-on points;

reducing said constant first root mean squared voltage to a constant second root mean squared voltage during said step of removing;

controlling said positive half cycles with a first IGBT device;

controlling said negative half cycles with a second IGBT device;

routing said positive half cycles to said first IGBT device with a first diode connected across said first IGBT device; and routing said negative half cycles to said second IGBT device with a second diode connected across said second IGBT device;
wherein a first IGBT shunt control transistor is placed in a shunt configuration with said first IGBT device, and
wherein a second IGBT shunt control transistor is placed in a shunt configuration with said second IGBT device.

2. The method of claim 1, wherein a third diode is connected across said first IGBT shunt control transistor, and
wherein a fourth diode is connected across said second IGBT shunt control transistor.

3. The method of claim 2, further comprising the steps of:
modulating said positive half cycles with said first IGBT device and said first diode, and
clamping an opposite polarity voltage resulting from an electromagnetic field during said step of modulating with said first IGBT shunt control transistor and said third diode.

4. The method of claim 3, further comprising the steps of:
modulating said negative half cycles with said second IGBT device and said second diode, and
clamping an opposite polarity voltage resulting from an electromagnetic field during said step of modulating said negative half cycles with said second IGBT shunt control transistor and said fourth diode.

5. The method of claim 4, wherein a first transorb device is connected across said first and second IGBT devices, and
wherein a second transorb device is connected across said first and second IGBT shunt control transistors.

6. The method of claim 4, further comprising the step of:
clamping a spike during a switching transition with a first transorb device connected across said first and second IGBT devices.

7. The method of claim 6, further comprising the step of:
clamping a mains bourne transient signal with said first transorb device.

8. A method for providing constant loading in AC power applications using a modulating sine wave having a constant first root mean squared voltage and positive half cycles and negative half cycles, said method comprising the steps of:
selecting randomly a plurality of turn-on points along said modulating sine wave, wherein each of said turn-on points is paired with a turn-off point that immediately precedes said turn-on point, and wherein said selection of said turn-on points is made via at least one field effect transistor;
determining said turn-off points;
removing slices from said modulating sine wave wherein each of said slices is between one of said pairs of turn-off points and turn-on points;
reducing said constant first root mean squared voltage to a constant second root mean squared voltage during said step of removing;
controlling said positive half cycles with a first FET device;
controlling said negative half cycles with a second FET device;
routing said positive half cycles to said first FET device with a first diode connected across said first FET device; and
routing said negative half cycles to said second FET device with a second diode connected across said second FET device;
wherein a first FET shunt control transistor is placed in a shunt configuration with said first FET device, and
wherein a second FET shunt control transistor is placed in a shunt configuration with said second FET device.

9. The method of claim 8, wherein a third diode is connected across said first FET shunt control transistor, and
wherein a fourth diode is connected across said second FET shunt control transistor.

10. A system for providing constant loading in AC power applications comprising:
a modulating sine wave having a plurality of positive half cycles and negative half cycles and a constant first root mean squared voltage;
a means for selecting randomly a plurality of turn-on points along said positive half cycles of said modulating sine wave, wherein each of said turn-on points along said positive half cycles is paired with a turn-off point that immediately precedes said turn-on point;
a means for determining said turn-off points of said positive half cycles of said modulating sine wave;
a means for selecting randomly a plurality of turn-on points along said negative half cycles of said modulating sine wave, wherein each of said turn-on points along said negative half cycles is paired with a turn-off point that immediately precedes said turn-on point;
a means for determining said turn-off points of said negative half cycles of said modulating sine wave;
a means for removing slices from said positive half cycles of said modulating sine wave wherein each of said slices is between one of said pairs of turn-off points and turn-on points; and
a means for removing slices from said negative half cycles of said modulating sine wave wherein each of said slices is between one of said pairs of turn-off points and turn-on points,
wherein said turn-off points of said positive half cycles and said turn-off points of said negative half cycles are determined so as to reduce said constant first root mean squared voltage to a constant second root mean squared voltage,
wherein said means for removing slices from said positive half cycles comprises a first IGBT device, and said means for removing slices from said negative half cycles comprises a second IGBT device,
wherein a first diode is connected across said first IGBT device and is configured to rout said positive half cycles to said first IGBT device, and a second diode is connected across said second IGBT device and is configured to rout said negative half cycles to said second IGBT device, and
wherein a first IGBT shunt control transistor is placed in shunt configuration with said first IGBT device, and a second IGBT shunt control transistor is placed in a shunt configuration with said second IGBT device.

11. The system of claim 10, wherein a third diode is connected across said first IGBT shunt control transistor, and
wherein a fourth diode is connected across said second IGBT shunt control transistor.

12. The system of claim 11, wherein a first transorb device is connected across said first and second IGBT devices, and
wherein a second transorb device is connected across said first and second IGBT shunt control transistors.

13. A system for providing constant loading in AC power applications comprising:
a modulating sine wave having a plurality of positive half cycles and negative half cycles and a constant first root mean squared voltage;
a means for selecting randomly a plurality of turn-on points along said positive half cycles of said modulating sine wave, wherein each of said turn-on points along said positive half cycles is paired with a turn-off point that immediately precedes said turn-on point;

a means for determining said turn-off points of said positive half cycles of said modulating sine wave;

a means for selecting randomly a plurality of turn-on points along said negative half cycles of said modulating sine wave, wherein each of said turn-on points along said negative half cycles is paired with a turn-off point that immediately precedes said turn-on point;

a means for determining said turn-off points of said negative half cycles of said modulating sine wave;

a means for removing slices from said positive half cycles of said modulating sine wave wherein each of said slices is between one of said pairs of turn-off points and turn-on points; and a means for removing slices from said negative half cycles of said modulating sine wave wherein each of said slices is between one of said pairs of turn-off points and turn-on points, wherein said turn-off points of said positive half cycles and said turn-off points of said negative half cycles are determined so as to reduce said constant first root mean squared voltage to a constant second root mean squared voltage, wherein said means for removing slices from said positive half cycles comprises a first FET device, and said means for removing slices from said negative half cycles comprises a second FET device, wherein a first diode is connected across said first FET device and is configured to rout said positive half cycles to said first FET device, and a second diode is connected across said second FET device and is configured to rout said negative half cycles to said second IGBT device, and wherein a first FET shunt control transistor is placed in shunt configuration with said first FET device, and a second FET shunt control transistor is placed in a shunt configuration with said second FET device.

14. The system of claim 13, wherein a third diode is connected across said first FET shunt control transistor, and wherein a fourth diode is connected across said second FET shunt control transistor.

15. The system of claim 14, wherein a first transorb device is connected across said first and second FET devices, and wherein a second transorb device is connected across said first and second FET shunt control transistors.

16. A system for providing constant loading in AC power applications comprising:

a means for polling at least one motor controller in a network configuration to determine a consumption level of power;

a means for grouping said at least one motor controller according to said consumption level of power;

at least one modulating sine wave applied to said at least one motor controller having at least one positive half cycle and at least one negative half cycle and a constant first root mean squared voltage;

a means for selecting randomly at least one turn-on point of said at least one positive half cycle of said at least one modulating sine wave applied to said at least one motor controller;

a means for determining at least one turn-off point of said at least one positive half cycle of said at least one modulating sine wave applied to said at least one motor controller;

a means for selecting randomly at least one turn-on point of said at least one negative half cycle of said at least one modulating sine wave applied to said at least one motor controller;

a means for determining at least one turn-off point of said at least one negative half cycle of said at least one modulating sine wave applied to said at least one motor controller;

a means for removing at least one slice located under said at least one positive half cycle of said modulating sine wave applied to said at least one motor controller wherein said at least one slice is an area under said at least one positive half cycle between said at least one turn-off point and said at least one turn-on point; and a means for removing at least one slice located under said at least one negative half cycle of said modulating sine wave applied to said at least one motor controller wherein said at least one slice is an area under said at least one negative half cycle between said at least one turn-off point and said at least one turn-on point, wherein said at least one turn-off point of said at least one positive half cycle and said at least one turn-off point of said at least one negative half cycle are determined so as to reduce said constant first root mean squared voltage to a constant second root mean squared voltage, wherein said means for removing slices from said positive half cycles comprises a first IGBT device, and said means for removing slices from said negative half cycles comprises a second IGBT device, wherein a first diode is connected across said first IGBT device and is configured to rout said positive half cycles to said first IGBT device, and a second diode is connected across said second IGBT device and is configured to rout said negative half cycles to said second IGBT device, wherein a first IGBT shunt control transistor is placed in shunt configuration with said first IGBT device, and a second IGBT shunt control transistor is placed in a shunt configuration with said second IGBT device.

17. The system of claim 16, wherein a third diode is connected across said first IGBT shunt control transistor, and wherein a fourth diode is connected across said second IGBT shunt control transistor.

18. The system of claim 17, wherein a first transorb device is connected across said first and second IGBT devices, and wherein a second transorb device is connected across said first and second IGBT shunt control transistors.

\* \* \* \* \*